US009069513B2

United States Patent
Ueda et al.

(10) Patent No.: US 9,069,513 B2
(45) Date of Patent: Jun. 30, 2015

(54) PRINT CONTROL DEVICE, EMAIL TRANSMISSION DEVICE, PRINT CONTROLLING METHOD AND NON-TRANSITORY COMPUTER READABLE RECORDING MEDIUM

(71) Applicant: Konica Minolta, Inc., Chiyoda-ku (JP)

(72) Inventors: Hiroki Ueda, Toyohashi (JP); Tomokazu Kato, Toyokawa (JP); Kaoru Fukuoka, Toyokawa (JP); Mitsutaka Morita, Nagoya (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 13/945,464

(22) Filed: Jul. 18, 2013

(65) Prior Publication Data

US 2014/0022592 A1    Jan. 23, 2014

(30) Foreign Application Priority Data

Jul. 20, 2012 (JP) ................................. 2012-161328

(51) Int. Cl.
 G06F 3/12 (2006.01)
 G06K 15/00 (2006.01)
 (Continued)

(52) U.S. Cl.
 CPC .......... G06F 3/1293 (2013.01); H04N 1/00212 (2013.01); G06F 3/1219 (2013.01);
 (Continued)

(58) Field of Classification Search
 CPC ... H04L 12/58; H04L 12/5835; H04L 51/066; H04L 51/08; H04L 51/12; H04L 51/18; H04L 51/30; G06F 21/608; G06F 3/1222; G06F 3/1238; G06F 3/1293; H04N 1/32609; H04N 1/32619; H04N 1/32651; H04N 1/32641; H04N 1/32662; H04N 1/00212; H04N 1/00244; H04N 1/00209; H04N 1/32069; H04N 1/444; G06Q 10/107
 USPC .......... 358/1.11–1.18, 1.1, 2.1, 1.9, 400–404; 710/33; 709/206, 207, 224, 236, 239
 See application file for complete search history.

(56) References Cited

U.S. PATENT DOCUMENTS 8,200,750 B2 * 6/2012 Odaira .......................... 709/203
8,259,325 B2   9/2012 Sato
(Continued)

FOREIGN PATENT DOCUMENTS

JP    2002-334042 A    11/2002
JP    2005-269422 A     9/2005
(Continued)

OTHER PUBLICATIONS

Japanese Office Action issued Oct. 28, 2014, in corresponding Japanese Patent Application No. 2012-161328, and English translation thereof.

Primary Examiner — Chad Dickerson
(74) Attorney, Agent, or Firm — Buchanan Ingersoll & Rooney PC

(57) ABSTRACT

A print control device, comprises: a receiving part for receiving an email; an address extracting part for extracting an address designated as a recipient of the email received by the receiving part; and an output controlling part for controlling production of a printed output based on the email when the receiving part receives the email. The output controlling part does not produce the printed output based on the email received by the receiving part if the multiple addresses are extracted by the address extracting part.

21 Claims, 15 Drawing Sheets

(51) Int. Cl.
*H04N 1/44* (2006.01)
*H04N 1/00* (2006.01)

(52) U.S. Cl.
CPC .............. *G06F3/1239* (2013.01); *G06F 3/126* (2013.01); *G06F 3/1285* (2013.01); *H04N 1/00233* (2013.01); *H04N 1/4433* (2013.01)

(56) References Cited

U.S. PATENT DOCUMENTS

| | | | |
|---|---|---|---|
| 2002/0140989 A1* | 10/2002 | Shinchi et al. | 358/402 |
| 2003/0233411 A1* | 12/2003 | Parry et al. | 709/206 |
| 2004/0196492 A1* | 10/2004 | Johnson et al. | 358/1.15 |
| 2008/0080001 A1 | 4/2008 | Yamada | |
| 2008/0239371 A1* | 10/2008 | Sato | 358/1.15 |
| 2008/0307059 A1* | 12/2008 | Ono | 709/206 |
| 2010/0328707 A1* | 12/2010 | Miyake | 358/1.15 |
| 2012/0147421 A1* | 6/2012 | Tanaka | 358/1.15 |

FOREIGN PATENT DOCUMENTS

| | | |
|---|---|---|
| JP | 2007-111920 A | 5/2007 |
| JP | 2008-060880 A | 3/2008 |
| JP | 2008-087177 A | 4/2008 |
| JP | 2008-090359 A | 4/2008 |
| JP | 2008-302629 A | 12/2008 |
| JP | 2009-193547 A | 8/2009 |
| JP | 2009193547 A * | 8/2009 |

* cited by examiner

PRINT CONTROL DEVICE, EMAIL TRANSMISSION DEVICE, PRINT CONTROLLING METHOD AND NON-TRANSITORY COMPUTER READABLE RECORDING MEDIUM

This application is based on the application No. 2012-161328 filed in Japan, the contents of which are hereby incorporated by reference.

BACKGROUND OF THE INVENTION

1. Field of the Invention

The present invention relates to a print control device, an email transmission device, a print controlling method and a non-transitory computer readable recording medium. The present invention more specifically relates to a technique for controlling production of a printed output with an email print function.

2. Description of the Background Art

Conventional image forming apparatuses called as network printers or MFPs (Multi-functional peripherals) having an email print function are known. This email print function is to produce a printed output of a file attached to an email in response to receiving the email over a network. This known technique is introduced for example in Japanese Patent Application Laid-Open No. JP 2005-269422 A (hereafter, document 1), Japanese Patent Application Laid-Open No. JP 2008-90359 A (hereafter, document 2) and Japanese Patent Application Laid-Open No. JP 2009-193547 A (hereafter, document 3).

According to the known technique disclosed in document 1, for example, an email setting a right to access an attachment file which is stored in a print server is forwarded to a user in order to improve security for storing the attachment file contained in the email in the print server.

According to the known technique disclosed in document 2, on an image forming apparatus which sends a print completion notification after the printed output is produced by the email print function, a wasteful printed output is prevented from being produced by sending the print completion notification to another image forming apparatus including the email print function. More specifically, according to the known technique disclosed in document 2, the image forming apparatus does not send the print completion notification to an address which restricts incoming print completion notification registered in advance.

According to the known technique disclosed in document 3, two email addresses of an image forming apparatus are configured. When the image forming apparatus receives an email addressed to a first address, the image forming apparatus produces the printed output immediately, and when receiving the email addressed to a second address, the image forming apparatus stores an attachment file of the received email without producing the printed output immediately.

For emails sent and received under an office environment, they are often sent to multiple users to share information between the multiple users. A first user who is a sender of the email sends to the multiple users and an image forming apparatus including the email print function. The first user is then allowed to send information to other users and also to give an instruction to produce a printed output based on the email to the image forming apparatus.

When a second user who received the email from the first user answers the email, he or she may create an email replying to the email without changing the addressees in the destination field those were in the destination field of the email received from the first user to share information. In such a case, the reply from the second user is sent to all the recipients including the image forming apparatus with the email print function. The printed output unintended by the second user may be produced. In some cases, there are many addresses designated in the destination field of the email received from the first user. In those cases, it is not easy for the second user to check if the address of the image forming apparatus with the email print function is included in the many addresses when he or she creates the reply. If the each of the multiple users replies the email without intending to give an instruction to produce the printed output, the image forming apparatus produces the unnecessary printed output every time it receives the reply, resulting in wasted printing resources such as printing sheets and toner.

This happens not only by sending replies. The first user sometimes creates a new email by copying the addresses in the destination field of the previous email sent and received in the past to send information to multiple users, for example. In such cases, when the first user sends the email without noticing the address of the image forming apparatus is included in the addresses in the destination field, the unnecessary printed output is produced by the image forming apparatus although he or she does not intends to.

SUMMARY OF THE INVENTION

The present invention is intended to solve the above problems. Thus, the present invention is intended to provide a print control device, an email transmission device, a print controlling method and a non-transitory computer readable recording medium capable of preventing production of an unnecessary printed output by an email print function.

First, the present invention is directed to a print control device.

According to an aspect of the print control device, the print control device, comprises: a receiving part for receiving an email; an address extracting part for extracting an address designated as a recipient of the email received by the receiving part; and an output controlling part for controlling production of a printed output based on the email when the receiving part receives the email. The output controlling part does not produce the printed output based on the email received by the receiving part if the multiple addresses are extracted by the address extracting part.

Second, the present invention is directed to an email transmission device for sending an email in response to an instruction given by a user.

According to an aspect of the email transmission device, the email transmission device, comprises: a storage part for registering in advance and storing therein an address of a print control device including an email print function; an address setting part for setting an address that is to receive the email based on the user's instruction; an address determining part for determining whether or not the address of the print control device is included in the multiple addresses when the multiple addresses are set by the address setting part; an address deleting part for deleting the address of the print control device from the multiple addresses set by the address setting part when the address determining part determines that the address of the print control device is included; and a mail transmitting part for sending the email designating the address as the recipient besides the address of the print control device deleted by the address deleting part.

Third, the present invention is directed to a print controlling method for controlling production of a printed output based on an email in response to receiving the email According to an aspect of the print controlling method, the print controlling method, comprises the steps of: (a) receiving the email; (b) extracting an address designated as a recipient of the email received in the step (a); and (c) controlling not to produce the printed output based on the email received in the step (a) when the multiple addresses are extracted in the step (b).

Forth, the present invention is directed to a non-transitory computer readable recording medium on which a program is recorded. The program is executable on a print control device capable of controlling production of a printed output based on an email in response to receiving the email.

According to an aspect of the non-transitory computer readable recording medium, the program executed on the print control device to function as a system comprises: a receiving part for receiving the email; an address extracting part for extracting an address designated as a recipient of the email received by the receiving part; and an output controlling part for controlling the production of the printed output based on the email when the receiving part receives the email. The output controlling part does not produce the printed output based on the email received by the receiving part if the multiple addresses are extracted by the address extracting part.

DESCRIPTION OF THE PRESENT PREFERRED EMBODIMENTS

Figure 1:
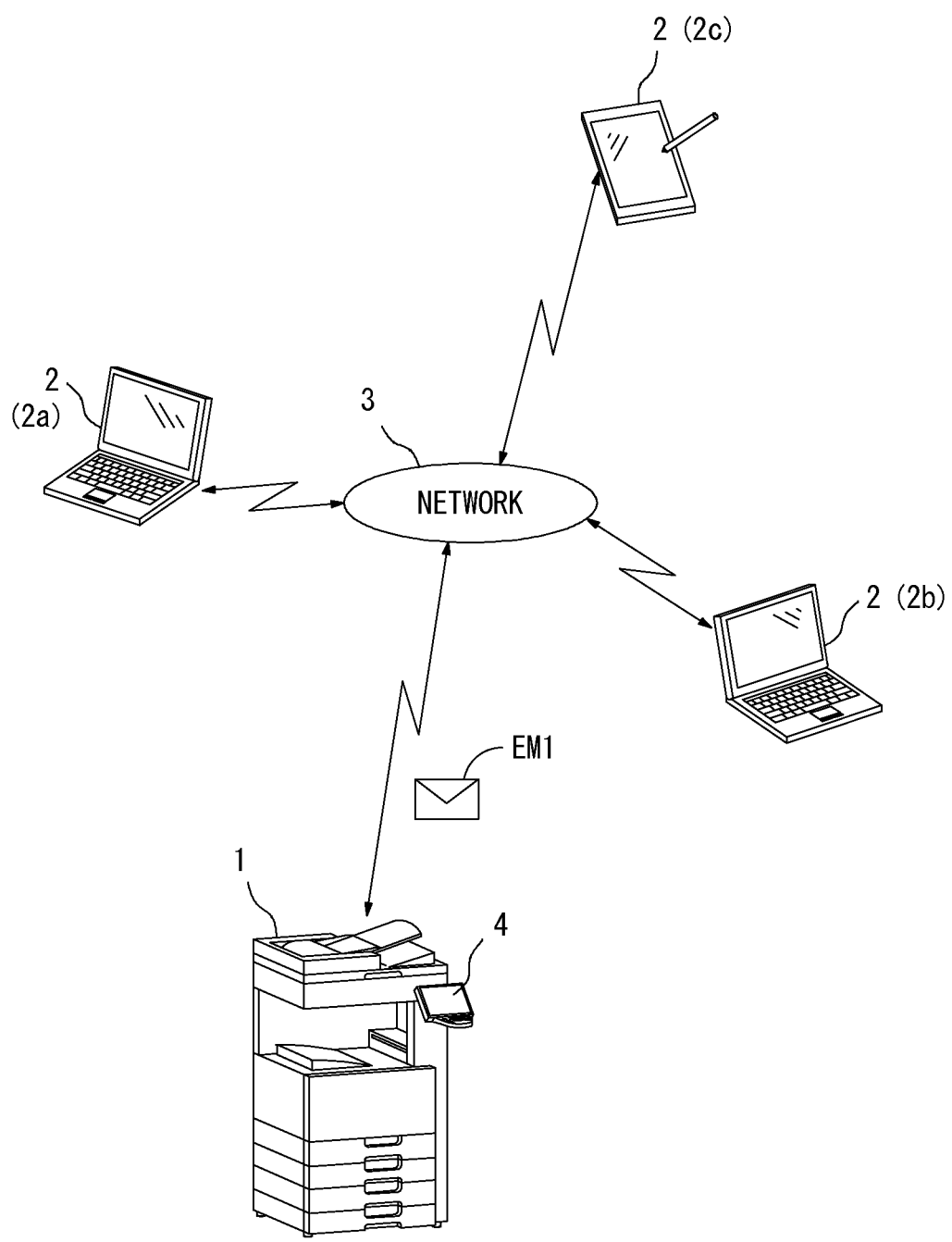
FIG. 1 shows an exemplary configuration of a network system that comprises an image forming apparatus.

Preferred embodiments of the present invention are described in detail below with reference to figures. In the description given below, those elements which are shared in common among figures are represented by the same reference numerals, and these elements are not discussed repeatedly for the same description.

(First Preferred Embodiment)

FIG. 1 shows an exemplary configuration of a network system that comprises an image forming apparatus 1 with an email print function. The network system includes a network 3 including LAN (Local Area Network), WAN (Wide Area Network) and an internet, for instance. The image forming apparatus 1 and multiple terminal devices 2 are connected together with or without wires over the network 3.

The image forming apparatus 1 formed from a device such as one of network printers or MFPs (Multi-functional peripherals) that produces a printed output by forming an image to a printing media such as printing sheets based on data received over the network 3. The image forming apparatus 1 including an email sending and transmitting function accesses a mail server not shown in figures but connected over the network 3 on a regular basis. The image forming apparatus 1 automatically receives an email EM1 if the email EM1 addressed to its own email address (hereafter, address) is saved in the mail server.

The image forming apparatus 1 includes an email print function. In response to receiving the email EM1 addressed to its address, the image forming apparatus 1 is capable of producing the printed output based on the received email EM1. For producing the printed output based on the email EM1, the image forming apparatus 1 is capable of producing the printed output of the body of the email EM1. When receiving the email EM1 containing an attachment file, the image forming apparatus 1 is capable of producing the printed output based on the attachment file. In response to receiving the email EM1 with the attachment file, it is configurable at will whether or not to produce the printed output of the body of the email.

Users such as administrators, for instance, are allowed to enable or disable the aforementioned email print function. It is assumed that the email print function is enabled in advance by the user such as the administrator. In this case, when the image forming apparatus 1 automatically receives the email EM1 addressed to its address, the email print function is activated on the image forming apparatus 1.

The image forming apparatus 1 is provided with an operational panel 4, a user interface operable by a user for making setting operation to the image forming apparatus 1, on the front side of its body. The user such as the administrator uses the operational panel 4 to enable in advance the email print function. The operational panel 4 receives various types of setting operations made by the administrator or other users besides the operation to enable or disable the email print function. In response to receive the various types of setting operations, the operational panel 4 configures the settings of the image forming apparatus 1 based on the received setting operations.

Each of the multiple terminal devices 2 is formed from an information terminal device such as a personal computer (PC), a smart phone or a tablet terminal, for example. In the example of FIG. 1, three terminal devices 2a, 2b and 2c are connected through the network 3 as the multiple terminal devices 2. The terminal devices 2a and 2b are formed from personal computers, and the terminal device 2c is formed from a device such as a smart phone or a tablet terminal. Each of the multiple terminal devices 2 including the email sending and transmitting function is capable of sending an email to the other device over the network 3 and receiving the email sent to the addresses including its address. Focusing on the email transmitting function, the multiple terminal devices 2 serve as email transmission devices.

The image forming apparatus 1 comprised in the network system as shown in FIG. 1 includes the email print function as described above. A user of each terminal device 2, for example, uses his or her own terminal device 2 to send the email EM1 to the address of the image forming apparatus 1. Thus, the user is allowed to make the image forming apparatus 1 produce the printed output based on the email EM1. Especially when the terminal device 2 is formed from a generic portable communication terminal such as a smart phone or a tablet terminal, it generally does not have a printer driver (program) to send specialized print data to the image forming apparatus 1 installed thereon. Even the portable communication terminal such as the smart phone or the tablet terminal is capable of making the image forming apparatus 1 produce the printed output by sending the email EM1 designating the address of the image forming apparatus 1 in the destination field, resulting in user-friendliness for producing the printed output by the email print function.

The image forming apparatus 1 of the first preferred embodiment also includes a function to prevent production of an unnecessary printed output unintended by the user with the email print function. The image forming apparatus 1 is described in detail next.

Figure 2:
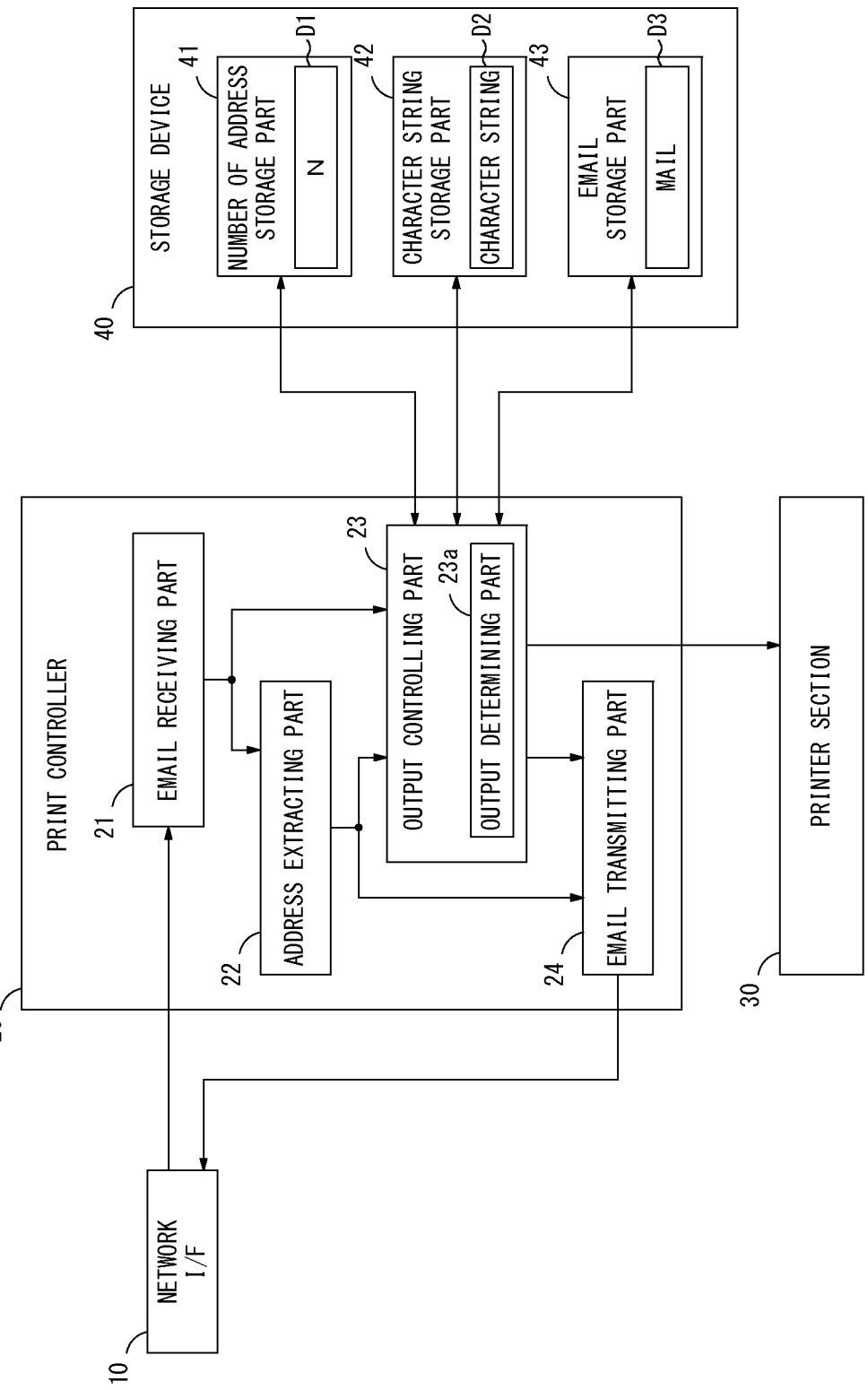
FIG. 2 is a block diagram showing an exemplary functional configuration of the image forming apparatus with an email print function.

FIG. 2 is a block diagram showing an exemplary functional configuration of the image forming apparatus 1. The example of FIG. 2 shows only the functional configuration relating to the email print function of the first preferred embodiment. As shown in FIG. 2, the image forming apparatus 1 includes a network interface 10, a print controller 20, a printer section 30 and a storage device 40 as its hardware configuration.

The network interface 10 is for the image forming apparatus 1 to send and receive data over the network 3. For sending and receiving emails, the image forming apparatus 1 does via the network interface 10.

The printer section 30 produces the printed output with a printing media such as a printing sheet. The printer section 30 feeds the printing medias such as printing sheets one by one in response to an instruction on print output from the print controller 20 and forms toner images based on drawing data received from the print controller 20. The printer section 30 then transfers and fixes the toner images on the printing media being fed, thereby producing the printed output.

The storage device 40 is formed from a nonvolatile storage device such as a hard disk drive, for instance. The storage device 40 includes a number of address storage part 41, a character string storage part 42 and an email storage part 43 as required.

The print controller 20 is a print control device that controls producing the printed output on the image forming apparatus 1. The print controller 20 controls operations of the printer section 30, thereby controlling the operations to produce the printed output. The print controller 20 includes, for example, a CPU, a ROM and a RAM that are not shown in figures. When the image forming apparatus 1 is powered on, the CPU reads and executes a program stored in the ROM and loads data such as temporary data required in accordance with execution of the program by the CPU into the RAM. The print controller 20 then serves as an email receiving part 21, an address extracting part 22, an output controlling part 23 and an email transmitting part 24. More specifically, each of the email receiving part 21, the address extracting part 22, the output controlling part 23 and the email transmitting part 24 is brought into operation in response to execution of the predetermined program on the print controller 20.

The email receiving part 21 accesses the mail server on a regular basis via the network interface 10. When the email that designates the address of the image forming apparatus 1 as a recipient is saved in the mail server, the email receiving part 21 automatically receives the saved email EM1. In response to receiving the email EM1, the email receiving part 21 outputs the received email EM1 to the address extracting part 22 and the output controlling part 23.

The address extracting part 22 extracts all addresses designated as the recipients of the email EM1 received by the email receiving part 21. The addresses extracted by the address extracting part 22 include not only the address designated as the original recipient (the address in the To: field) of the received email EM1 but also the address of the recipient of carbon copies (the address in the Cc: field). In response to extracting the address designated as the recipient of the email EM1, the address extracting part 22 outputs the extracted address to the output controlling part 23 and the email transmitting part 24.

When the email EM1 is received by the email receiving part 21, the output controlling part 23 checks whether or not the email print function is enabled. If the email print function is enabled, the output controlling part 23 controls production of the printed output based on the email EM1. When the email print function is disabled at the receipt of the email EM1, the output controlling part 23 does not produce the printed output based on the email EM1. The process detail of the output controlling part 23 when the email print function is enabled is described next.

As illustrated in FIG. 2, the output controlling part 23 includes an output determining part 23a. The output determining part 23a determines whether or not to produce the printed output based on the email EM1. More specifically, the output determining part 23a restricts the production of the printed output based on the email EM1 if more than one address is extracted by the address extracting part 22. If only one address is extracted by the address extracting part 22, the output determining part 23a allows the production of the printed output based on the email EM1.

The output determining part 23a does not restrict the production of the printed output immediately even when more than one address is extracted by the address extracting part 22. The output determining part 23a first checks whether or not number of address information D1 is stored in advance in the number of address storage part 41, then checking if character string information D2 is stored in the character string storage part 42.

The number of address information D1 is registered in advance as required by the administrator or the other users of the image forming apparatus 1. The number of the addresses N (N is integer, 2 or more) set optionally is registered as the number of address information D1. The printed output should not be produced based on the email designates the addresses as the recipient when the email is received.

Figure 3:
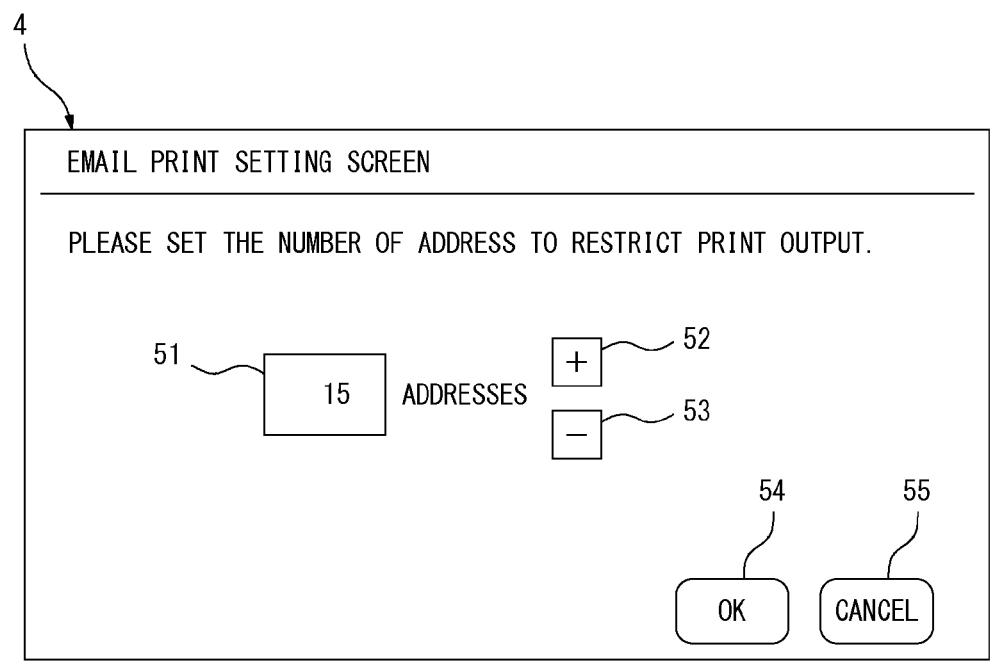
FIG. 3 is an example of a screen image displayed on a viewing area of an operational panel for setting number of address information.

FIG. 3 is an example of a screen image displayed on a viewing area of the operational panel 4 for setting the number of address information D1. When the administrator or the user of the image forming apparatus 1, for example, makes an operation to configure settings relating to the email print function, the screen image as illustrated in FIG. 3 appears on the viewing area of the operational panel 4. On the screen image, a set value field 51 showing the current set value relating to the number of the addresses N, increase and decrease keys 52 and 53 to increase or decrease the value in the set value field 51, an OK key 54 to register the number of the addresses N shown in the set value field 51 as the number of address information D1 and a cancel key 55 to cancel the registration of the number of address information D1 are shown. The administrator or the user makes the operation on the screen image, thereby making any address number N store in advance in the number of address storage part 41 as the number of address information D1. It is optional for the user to store in advance the number of address information D1 and the number of address information D1 may not be stored in the number of address storage part 41.

The character string information D2 is registered in advance by the administrator or the other users of the image forming apparatus 1 if necessary. Any character string, the production of the printed output is restricted when that is contained, is set and registered as the character string information D2.

Figure 4:
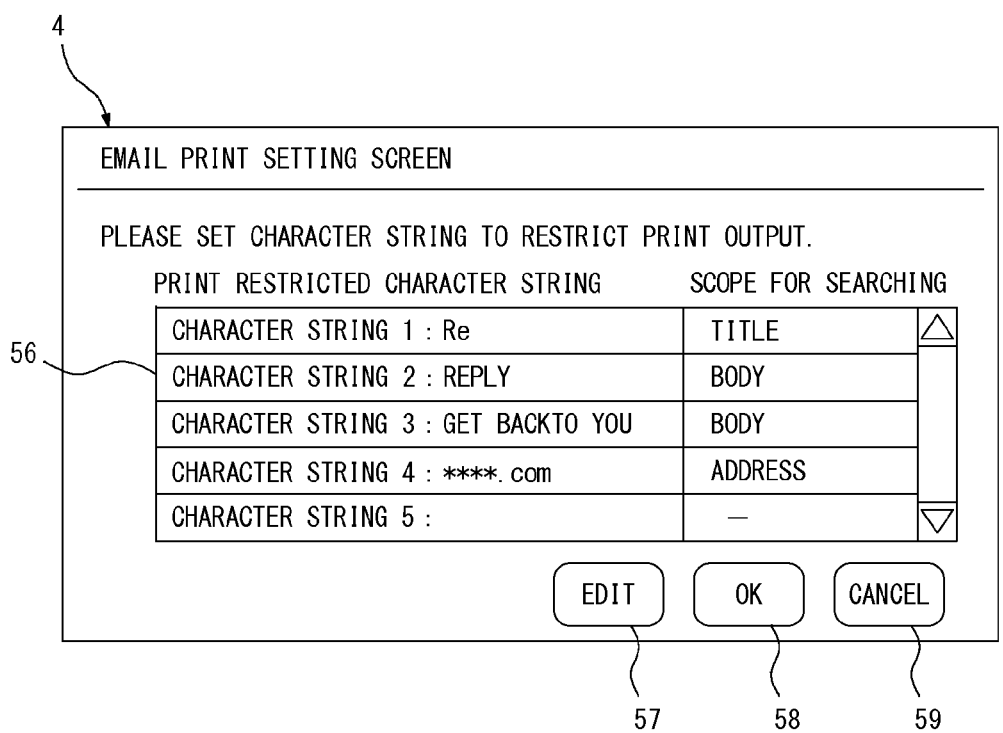
FIG. 4 is an example of a screen image displayed on the viewing area of the operational panel for setting character string information.

FIG. 4 is an example of a screen image displayed on the viewing area of the operational panel 4 for setting the character string information D2. When the administrator or the user of the image forming apparatus 1, for example, makes an operation to configure settings relating to the email print function, the screen image as illustrated in FIG. 4 appears on the viewing area of the operational panel 4. On the screen image, a list 56 which shows a character string, the production of the printed output is restricted when that is contained (hereafter, print restricted character string), and a scope for searching corresponding to the print restricted character string, an edit key 57 to add, delete or edit the character string shown on the list 56, an OK key 58 to register the character string shown on the list 56 as the character string information D2 and a cancel key 59 to cancel the registration of the character string information D2 are shown. The administrator or the user makes the operation on the screen image, thereby making any character string store in advance in the character string storage part 42 as the character string information D2. More than one character string may be registered as the character string information D2. It is, however, optional for the user to store in advance character string information D2, and the character string information D2 may not be stored in the character string storage part 42.

The output determining part 23a determines whether or not the number of address information D1 and the character string information D2 as described above are registered. Neither the number of address information D1 nor the character string information D2 may be registered. In this case, the production of the printed output based on the received email EM1 is restricted as the multiple addresses are extracted by the address extracting part 22. If either the number of address information D1 or the character string information D2 is registered, the output determining part 23a determines whether or not to produce the printed output with the registered information. If both the number of address information D1 and the character string information D2 are registered, the output determining part 23a determines whether or not to produce the printed output with both registered information.

When the number of address information D1 is registered in advance, the output determining part 23a determines if the number of the address M extracted from the email EM1 by the address extracting part 22 is equal to or more than the number of the addresses N registered as the number of address information D1. If the number of the address M is equal to or more than the number of the addresses N, the output determining part 23a restricts the production of the printed output based on the email EM1. If, on the other hand, the number of the address M is less than the number of the addresses N, the output determining part 23a determines that the production of the printed output based on the email EM1 is allowable. To be more specific, even when the multiple addresses are extracted by the address extracting part 22, the output determining part 23a determines whether or not to produce the printed output based on the email EM1 with the registered number of the addresses N if the number of address information D1 is registered.

When the character string information D2 is registered in advance, the output determining part 23a analyzes the email EM1 received by the email receiving part 21, thereby determining if the print restricted character string registered as the character string information D2 is contained in the email EM1. It is assumed that, for instance, more than one print restricted character string is registered as shown in FIG. 4. In this case, the output determining part 23a determines whether or not each of the registered print restricted character strings is contained in the corresponding scope for searching (for example, title, body or address) of the email EM1. When any of the print restricted character strings registered as the character string information D2 is contained in the corresponding scope for searching of the received email EM1, the output determining part 23a restricts the production of the printed output based on the email EM1. If, on the other hand, none of the print restricted character strings registered as the character string information D2 is contained in the corresponding scope for searching of the received email EM1, the output determining part 23a determines that the production of the printed output based on the email EM1 is allowable. To be more specific, even when the multiple addresses are extracted by the address extracting part 22, the output determining part 23a determines whether or not to produce the printed output depending on if the character string matches the print restricted character string registered as the character string information D2 is detected from the email EM1 when the character string information D2 is registered.

Both the number of address information D1 and the character string information D2 may be registered, and the output determining part 23a may determine to restrict the production of the printed output as a result of either the determination based on the number of address information D1 or the determination based on the character string information D2. In this case, the output determining part 23a determines to restrict the production of the printed output based on the received email EM1 at last even when the production of the printed output is determined to be allowable in response to either determination based on the number of address information D1 or the character string information D2. When the production of the printed output is determined to be allowable as a result of both determinations based on the number of address information D1 and the character string information D2, the output determining part 23a allows the production of the printed output based on the email EM1 from which the multiple addresses are extracted by the address extracting part 22.

The output controlling part 23 controls the production of the printed output based on the final determination result given by the output determining part 23a. More specifically, when the output determining part 23a determines to restrict the production of the printed output, the output controlling part 23 does not produce the printed output based on the email EM1 received by the email receiving part 21. When the output determining part 23a determines to allow the production of the printed output, the output controlling part 23 drives the printer section 30 based on the email EM1 received by the email receiving part 21 to produce the printed output based on the email EM1.

When multiple addresses are designated as the recipients of the email EM1 received over the network 3, the image forming apparatus 1 of the first preferred embodiment does not produce the printed output based on the received email EM1. If the additional conditions such as the number of address information D1 or the character string information D2 is set in advance, the image forming apparatus 1 determines whether or not to produce the printed output based on the set additional conditions and controls the production of the printed output in accordance with the determination result.

It is configured in advance by the user such as the administrator with the output controlling part 23 whether or not to store the email EM1 in the email storage part 43 when the printed output is not produced based on the email EM1. If it is configured to store the email EM1, based on which the printed output is not produced, in the email storage part 43, the output controlling part 23 stores the email EM1 in the email storage part 43 as the output determining part 23a determines to restrict the production of the printed output. Thus, the email EM1 received by the email receiving part 21 is stored as mail information D3 in the email storage part 43. If it is configured not to store the email EM1 in the email storage part 43, the output controlling part 23 discards the email EM1 received by the email receiving part 21 as the output determining part 23a determines to restrict the production of the printed output.

In response to storing the email EM1, based on which the printed output is not produced, in the email storage part 43, the output controlling part 23 preferably manages a retention period for the email EM1. No instruction on print output may be given even after a predetermined period of time (for instance, few hours) has elapsed. In such a case, the email EM1 stored in the email storage part 43 is preferably automatically deleted.

The email transmitting part 24 sends an email (notification mail) notifying that the printed output is not produced to the address of the sender of the email EM1 when the output controlling part 23 does not produce the printed output based on the email EM1. For sending the notification mail, the email transmitting part 24 pastes the text indicating the reason why the printed output is not produced in the body of the notification mail and sends it. It is assumed that, for example, the printed output is not produced because the multiple addresses designated as the recipients of the email EM1 are extracted by the address extracting part 22. In this case, the email transmitting part 24 pastes the text indicating that the printed output is not produced because the multiple addresses are designated as the recipients of the email EM1 in the body of the notification mail and sends it. It is assumed that, for example, the printed output is not produced because the number of address M extracted by the address extracting part 22 is equal to or more than the registered number of the addresses N. In this case, the email transmitting part 24 pastes the text indicating that the printed output is not produced because the number of the addresses equal to or more than the number of the addresses N are designated as the recipients of the email EM1 in the body of the notification mail and sends it. Furthermore, it is assumed that, for example, the printed output is not produced because the registered print restricted character string is contained in the received email EM1. In this case, the email transmitting part 24 pastes the text indicating that the printed output is not produced because the certain registered character string is contained in the email EM1 in the body of the notification mail and sends it.

By receiving the notification mail, the sender of the email EM1 is allowed to know that the printed output is not produced based on the email EM1 by the image forming apparatus 1. Also, the sender is allowed to know the reason why the printed output is not produced based on the email EM1. As a result, if the sender would like the printed output to be produced based on the email EM1, he or she may send again the email EM1 after solving the cause, thereby making the image forming apparatus 1 produce the printed output.

The email EM1, based on which the printed output is not produced by the output controlling part 23, is stored in the email storage part 43. In this case, the email transmitting part 24 pastes the text indicating that the email EM1 is stored or the text indicating the location where the email EM1 is stored in the body of the notification mail and sends it. Thus, the recipient of the notification mail is allowed to know the email EM1, based on which the printed output is not produced, is stored in the image forming apparatus 1.

When the email transmitting part 24 sends the aforementioned notification mail, all addresses extracted by the address extracting part 22 including the address of the sender of the email EM1 may be designated as the recipients.

According to the first preferred embodiment, when the email receiving part 21 receives the reply to the notification mail indicating that the email EM1 is stored, the email EM1 stored in the email storage part 43 is identified based on the reply. The output controlling part 23 reads the identified email EM1 in the email storage part 43 and drives the printer section 30, thereby producing the printed output.

The detailed sequential procedure of the process performed by the print controller 20 of the image forming apparatus 1 including the above-described configuration is described next. FIGS. 5, 6, 7 and 8 are flow diagrams explaining exemplary sequential procedures of the process performed by the print controller 20 of the image forming apparatus 1. This process is performed upon receipt by the email receiving part 21 of the email EM1 designating the address of the image forming apparatus 1 as the recipient.

Figure 5:
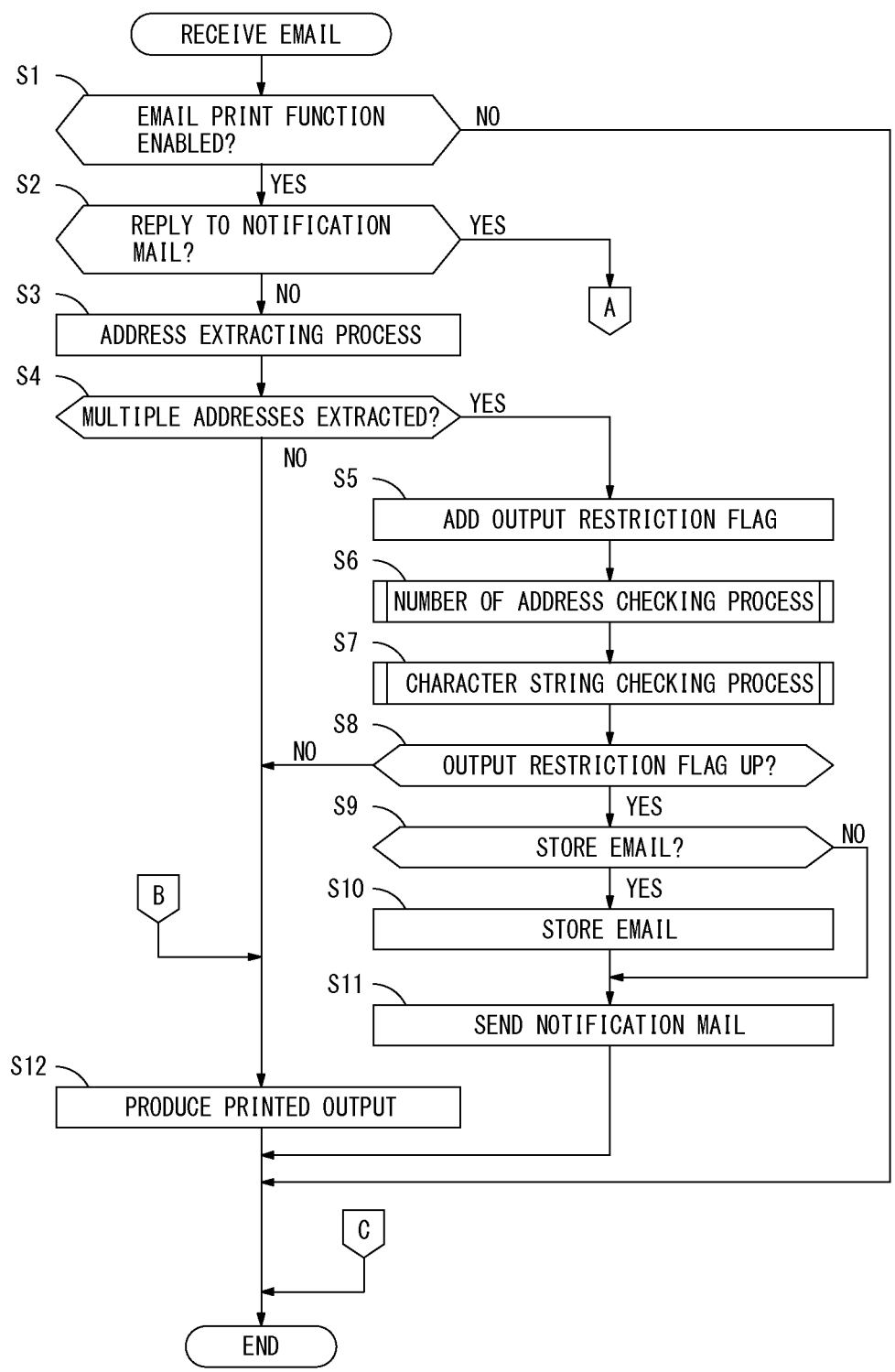
FIG. 5 is a flow diagram explaining an exemplary sequential procedure of the process performed by a print controller of the image forming apparatus.

By referring to FIG. 5, in response to receiving the email EM1 designating the address of the image forming apparatus 1 as the recipient, the print controller 20 determines whether or not the email print function is enabled (step S1). When the email print function is disabled (when a result of step S1 is NO), the image forming apparatus 1 does not produce the printed output based on the received email EM1. Thus, the process by the print controller 20 is complete. When the email print function is enabled (when a result of step S1 is YES), the print controller 20 determines if the received email EM1 is the reply to the notification mail previously sent (step S2). If the received email EM1 is not the reply to the notification mail (when a result of step S2 is NO), the address extracting part 22 of the print controller 20 is brought into operation. The address extracting part 22 then extracts all addresses designated as the recipients of the received email EM1 (step S3).

The output controlling part 23 is brought into operation next to determine whether or not the multiple addresses are extracted as the recipient of the email EM1 by the address extracting part 22 (step S4). If only one address is extracted as the recipient of the received email EM1, the output controlling part 23 moves on to step S12 and starts the process to produce the printed output based on the received email EM1 (step S12).

If the multiple addresses are extracted as the recipients of the received email EM1 (when a result of step S4 is YES), the output controlling part 23 adds an output restriction flag (step S5). The output controlling part 23 then performs a number of address checking process with maintaining the output restriction flag up (step S6).

Figure 6:
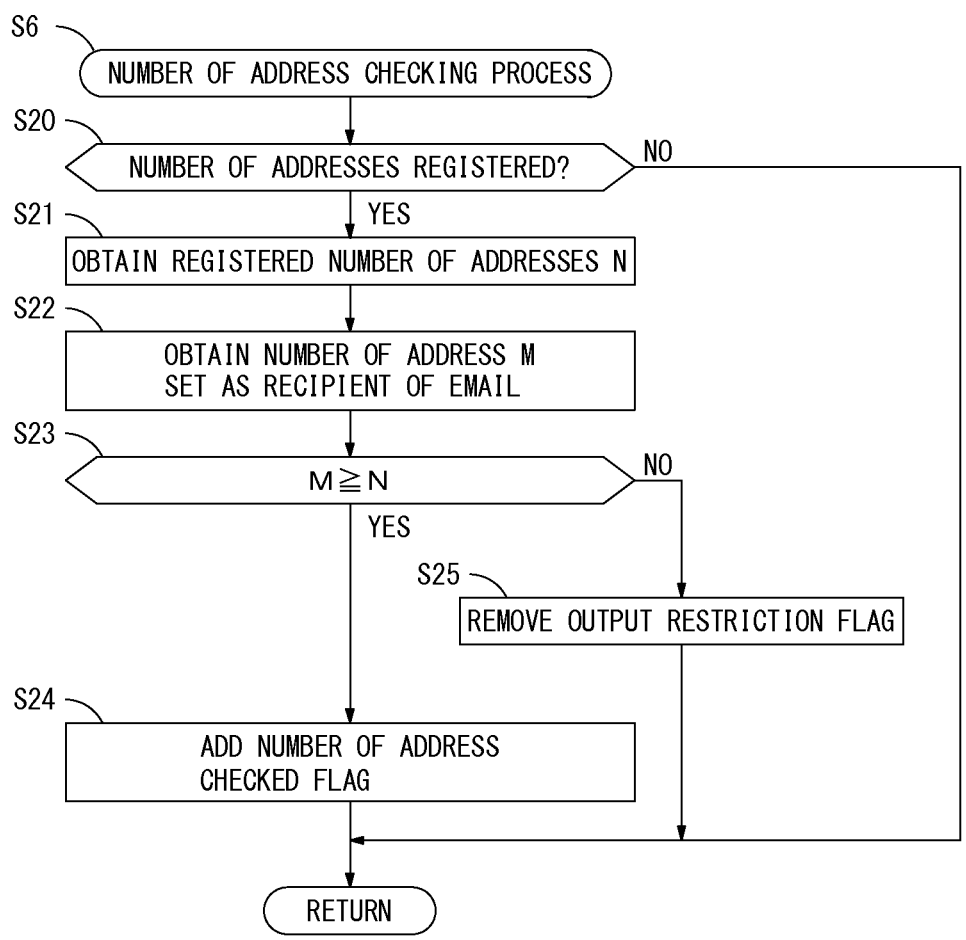
FIG. 6 is a flow diagram explaining an exemplary sequential procedure of the process performed by the print controller of the image forming apparatus.

FIG. 6 is a flow diagram explaining the detailed exemplary sequential procedure of the number of address checking process (step S6). Upon start of the process, the output controlling part 23 determines if the number of the addresses N is registered in advance (step S20). With no registered number of the addresses N (when a result of step S20 is NO), the output controlling part 23 completes the number of address checking process (step S6) without performing the rest of the process as shown in FIG. 6.

With the registered number of the addresses N (when a result of step S20 is YES), the output controlling part 23 reads the number of address information D1 in the number of address storage part 41 and obtains the registered number of the addresses N (step S21). The output controlling part 23 then obtains the number of address M extracted by the address extracting part 22 (step S22), and compares the extracted number of address M to the registered number of the addresses N (step S23). When the extracted number of address M is equal to or more than the registered number of the addresses N (when a result of step S23 is YES), the output controlling part 23 adds a number of address checked flag with maintaining the output restriction flag up (step S24). When the extracted number of address M is less than the registered number of the addresses N (when a result of step S23 is NO), the output controlling part 23 removes the output restriction flag (step S25). Thus, the number of address checking process (step S6) is complete, and the process returns to the flow diagram of FIG. 5.

Figure 7:
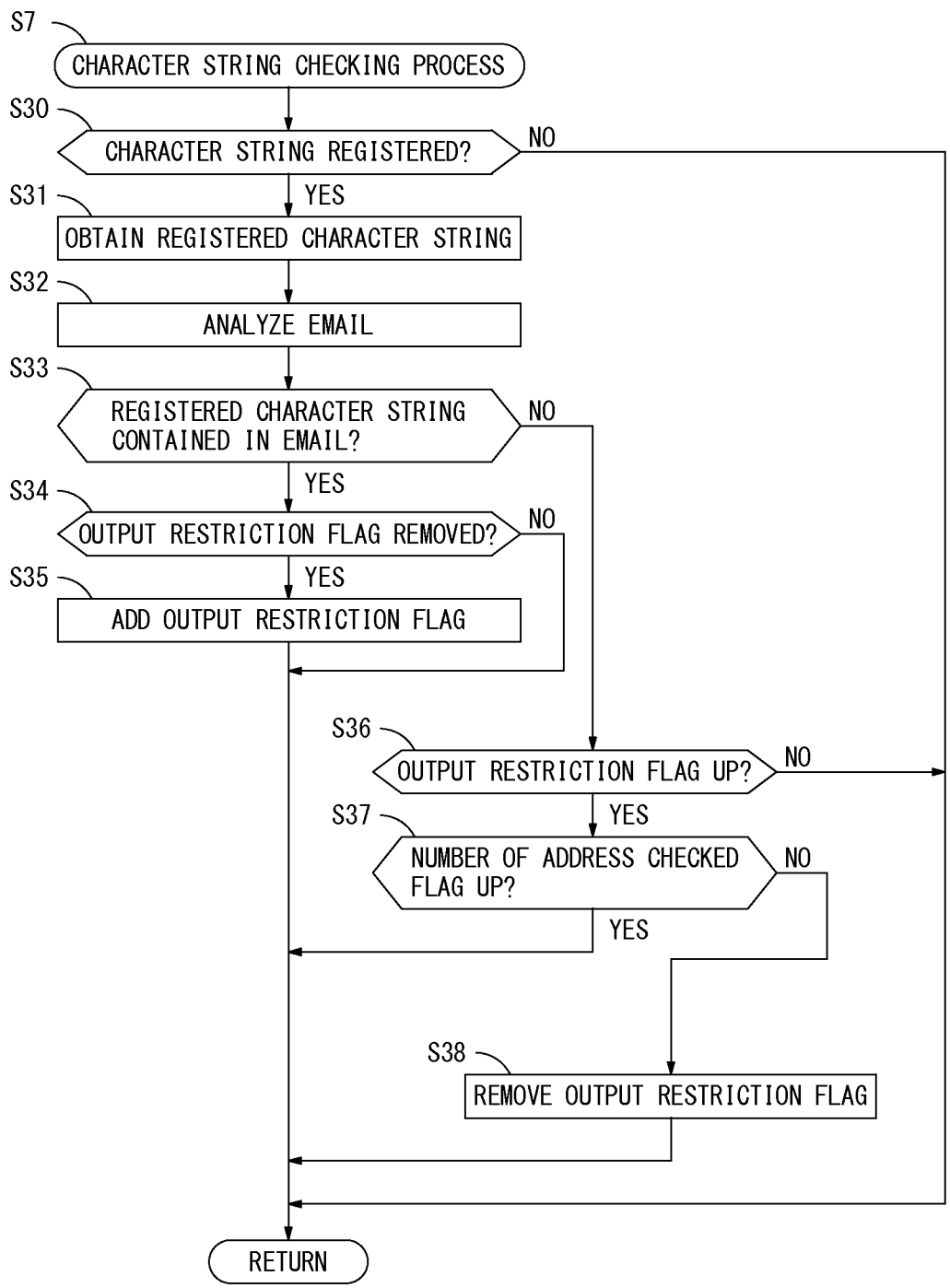
FIG. 7 is a flow diagram explaining an exemplary sequential procedure of the process performed by the print controller of the image forming apparatus.

The output controlling part 23 performs a character string checking process (step S7) next. FIG. 7 is a flow diagram explaining the detailed exemplary sequential procedure of the character string checking process (step S7). Upon start of the process, the output controlling part 23 determines whether or not the print restricted character string is registered in advance (step S30). With no registered print restricted character string (when a result of step S30 is NO), the output controlling part 23 completes the character string checking process (step S7) without performing the rest of the process as shown in FIG. 7.

With the registered print restricted character string (when a result of step S30 is YES), the output controlling part 23 reads the character string information D2 in the character string storage part 42 and obtains all the registered print restricted character strings (step S31). The output controlling part 23 performs a process to analyze the email EM1 to determine whether or not the registered print restricted character string is contained in the received email EM1 (step S32). In response to completing the analyzing process, the output controlling part 23 determines if at least one of the registered print restricted character strings is contained in the received email EM1 (step S33).

When at least one of the registered print restricted character strings is contained in the email EM1 (when a result of step S33 is YES), the output controlling part 23 determines whether or not the output restriction flag is removed (step S34). If the output restriction flag is removed, the output controlling part 23 adds the output restriction flag (step S35), and completes the character string checking process.

When none of the registered print restricted character strings is contained in the email EM1 (when a result of step S33 is NO), the output controlling part 23 determines whether or not the output restriction flag is up (step S36). If the output restriction flag has already been removed (when a result of step S36 is NO), it is not necessary to remove the output restriction flag so the character string checking process is complete. If the output restriction flag is up (when a result of step S36 is YES), the output controlling part 23 determines whether or not the number of address checked flag is up (step S37).

When the number of address checked flag is up (when a result of step S37 is YES), it means it has already determined that the production of the printed output is restricted by the number of address checking process (step S6). So, the output controlling part 23 completes the character string checking process without removing the output restriction flag. When the number of address checked flag is not up (when a result of step S37 is NO), it means the determination whether or not to restrict the production of the printed output has not made yet in the number of address checking process (step S6). In this case, the output controlling part 23 removes the output restriction flag (step S38). Thus, the character string checking process (step S7) is complete and the process backs to the flow diagram of FIG. 5.

The output controlling part 23 then determines whether or not the output restriction flag is up (step S8). If the output restriction flag has been removed (when a result of step S8 is NO), the output controlling part 23 moves on to step S12 to start the process to produce the printed output based on the received email EM1 (step S12).

If the output restriction flag is up in step S8 (when a result of step S8 is YES), the output controlling part 23 determines whether or not to store the email EM1 (step S9). When configured to store the email EM1 (when a result of step S9 is YES), the output controlling part 23 stores the email EM1 in the email storage part 43 (step S10). The output controlling part 23 then sends the notification mail notifying that the printed output is not produced (step S11) and completes the process performed at receipt of the email. When the result of step S8 is YES and the process in steps S9 to S11 is performed, the printed output is not produced in step S12. Thus, the printed output is not produced by the email print function.

Figure 8:
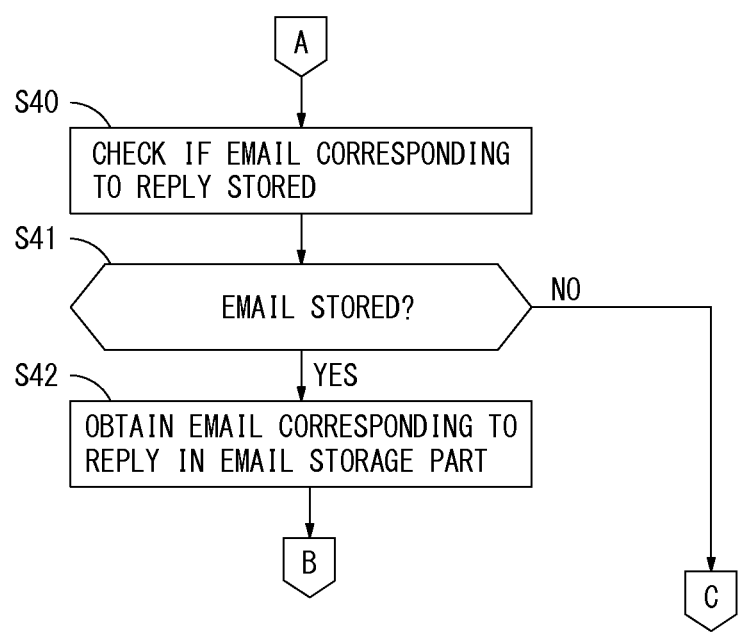
FIG. 8 is a flow diagram explaining an exemplary sequential procedure of the process performed by the print controller of the image forming apparatus.

If it is determined in step S2 that the received email EM1 is the reply to the notification mail previously sent (when a result of step S2 is YES), the process skips to the flow diagram of FIG. 8.

The print controller 20 checks if the email corresponding to the reply is stored in the email storage part 43 (step S40). The email corresponding to the reply is the email which is received prior to the reply and based on which the printed output is not produced on the image forming apparatus 1. Also, the email led to send the notification mail, the reply to which is sent. The notification mail, for example, sent when the email EM1 based on which the printed output is not produced is stored in the email storage part 43 contains the text indicating that the email EM1 is stored or the text indicating the location where the email EM1 is stored in the body as described above. The body of the reply to the notification mail also contains the similar text. In response to receiving the reply to the notification mail, the email receiving part 21 analyzes the body of the reply, thereby checking whether or not the email corresponding to the reply is stored in the email storage part 43. The other ways may be used to check whether or not the email corresponding to the reply is stored in the email storage part 43.

In response to checking that the email corresponding to the reply is stored in the email storage part 43 (when a result of step S41 is YES), the print controller 20 reads and obtains the email corresponding to the reply in the email storage part 43 (step S42). The process moves on to step S12 of FIG. 5 and the print controller 20 starts the process to produce the printed output based on the email read from the email storage part 43.

When checking that the email corresponding to the reply is not stored in the email storage part 43 (when a result of step S41 is NO), the print controller 20 completes the process performed at the receipt of the email without performing particular process.

The above-described process is performed by the print controller 20. As a result, in response to receiving the email sent to its address, the image forming apparatus 1 determines whether or not to produce the printed output based on the received email and controls the production of the printed output by the email print function based on the determination result.

Figure 9:
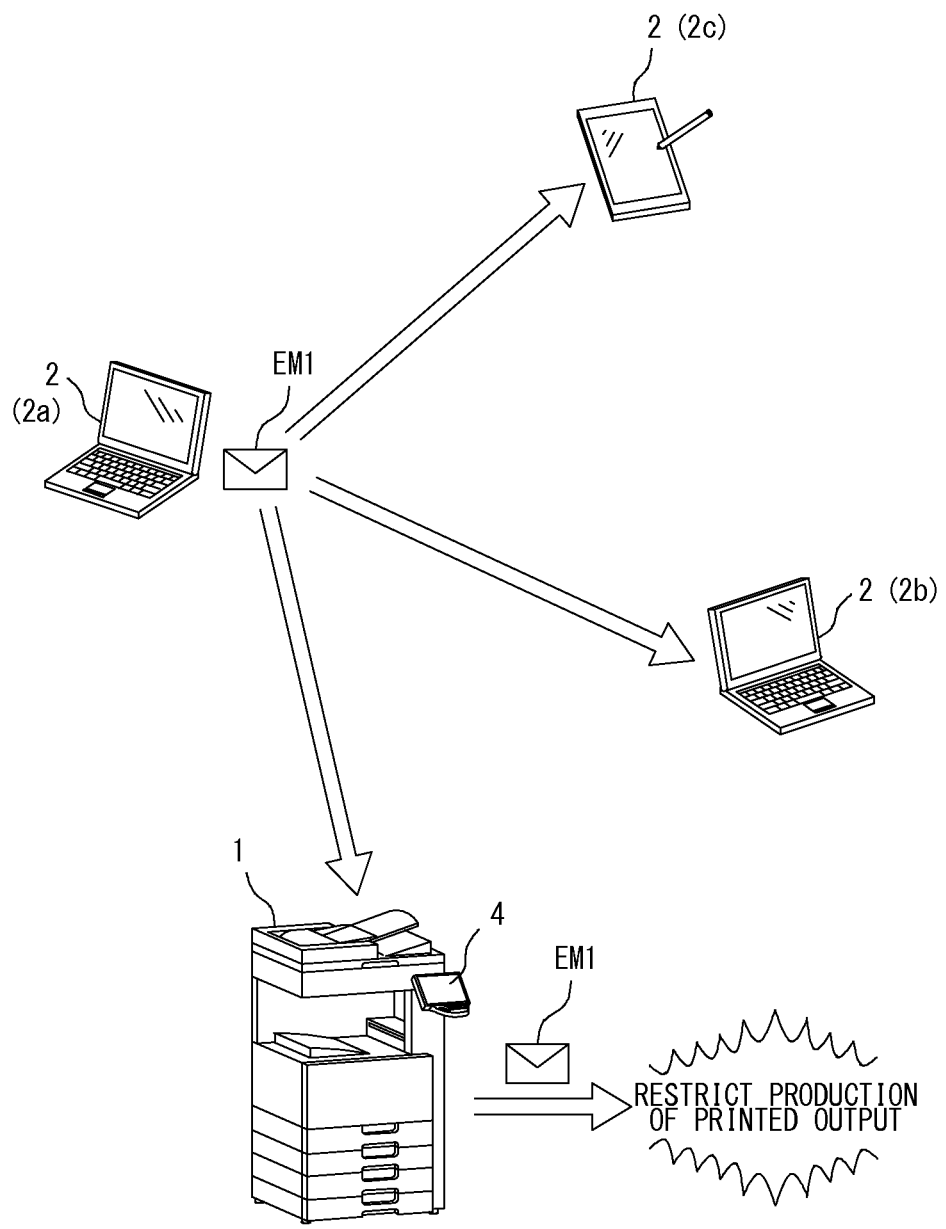
FIG. 9 shows a concept of an exemplary operation relating to the email print function on the image forming apparatus.

FIG. 9 shows a concept of an exemplary operation relating to the email print function on the image forming apparatus 1. The example of FIG. 9 shows a case where the email EM1 designates the multiple addresses including the addresses of the other terminal devices 2*b* and 2C and that of the image forming apparatus 1 as recipients is sent from the terminal device 2*a* on the network system as illustrated in FIG. 1. In response to receiving the email EM1 from the terminal device 2*a* as shown in FIG. 9, the image forming apparatus 1 extracts the addresses designated as the recipients of the email EM1 as described above. In this case, the multiple addresses are extracted from the email EM1 so that the image forming apparatus 1 restricts the production of the printed output by the email print function. Thus, the printed output is not produced based on the email EM1. The number of address information D1 may be registered in advance. In this case, if the registered number of the addresses N is 2 or 3, the printed output is not produced based on the email EM1. The character string information D2 may be registered in advance. In this case, if the print restricted character string registered as the character string information D2 is contained in the email EM1, the printed output is not produced based on the email EM1.

Sometimes, the user of the terminal device 2*a*, for instance, copies the multiple addresses designated as the recipients of the email sent and received in the past to create the email EM1 and sends the email EM1 without noticing the address of the image forming apparatus 1 is included in the multiple addresses designated as the recipients of the email EM1. Even in such a case, the image forming apparatus 1 does not produce the printed output based on the email EM1. Thus, the production of the unnecessary printed output unintended by the user of the terminal device 2*a* is preferably prevented.

Figure 10:
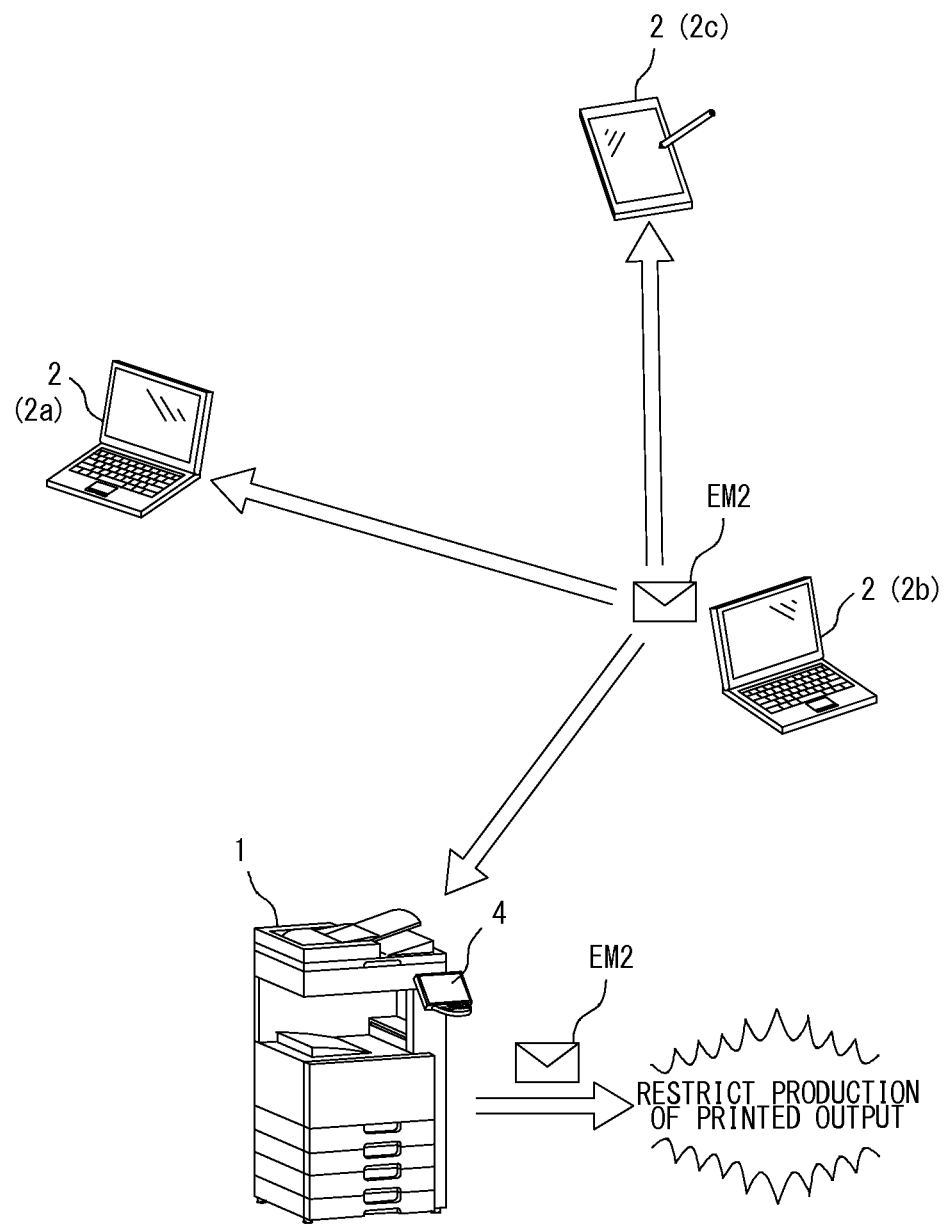
FIG. 10 shows a concept of another exemplary operation relating to the email print function on the image forming apparatus.

FIG. 10 shows a concept of another exemplary operation relating to the email print function on the image forming apparatus 1. The example of FIG. 10 shows a case where the terminal device 2*b* which received the email EM1 from the terminal device 2*a* sends a reply EM2 designating all the multiple addresses as the recipients the same addresses designated as the recipients of the email EM1. In response to receiving the email EM2 from the terminal device 2*b* as shown in FIG. 10, the image forming apparatus 1 extracts the addresses designated as the recipients of the email EM2 as described above. In this case, the multiple addresses are extracted from the email EM2 so that the image forming apparatus 1 restricts the production of the printed output by the email print function. Thus, the printed output is not produced based on the email EM2. The number of address information D1 may be registered in advance. In this case, if the registered number of the addresses N is 2 or 3, the printed output is not produced based on the email EM2. The character string information D2 may be registered in advance. In this case, if the print restricted character string registered as the character string information D2 is contained in the email EM2, the printed output is not produced based on the email EM2. In particular, the character string, such as "Re" indicating the email is the reply, is registered as the print restricted character string with the title of the received email, the scope for searching corresponding to the character string. Thus, when the image forming apparatus 1 receives the reply EM2 designating the multiple addresses as the recipients, it is capable of not producing the printed output based on the reply EM2.

The user of the terminal device 2*b*, for instance, may not change the multiple addresses designated as the recipients of the email EM1 to create the reply EM2 for sharing the information and sends the reply EM2 without noticing the address of the image forming apparatus 1 is included in the multiple addresses designated as the recipients of the reply EM2. Even in such a case, the image forming apparatus 1 does not produce the printed output based on the reply EM2. Thus, the production of the unnecessary printed output unintended by the user of the terminal device 2*b* is preferably prevented.

Figure 11:
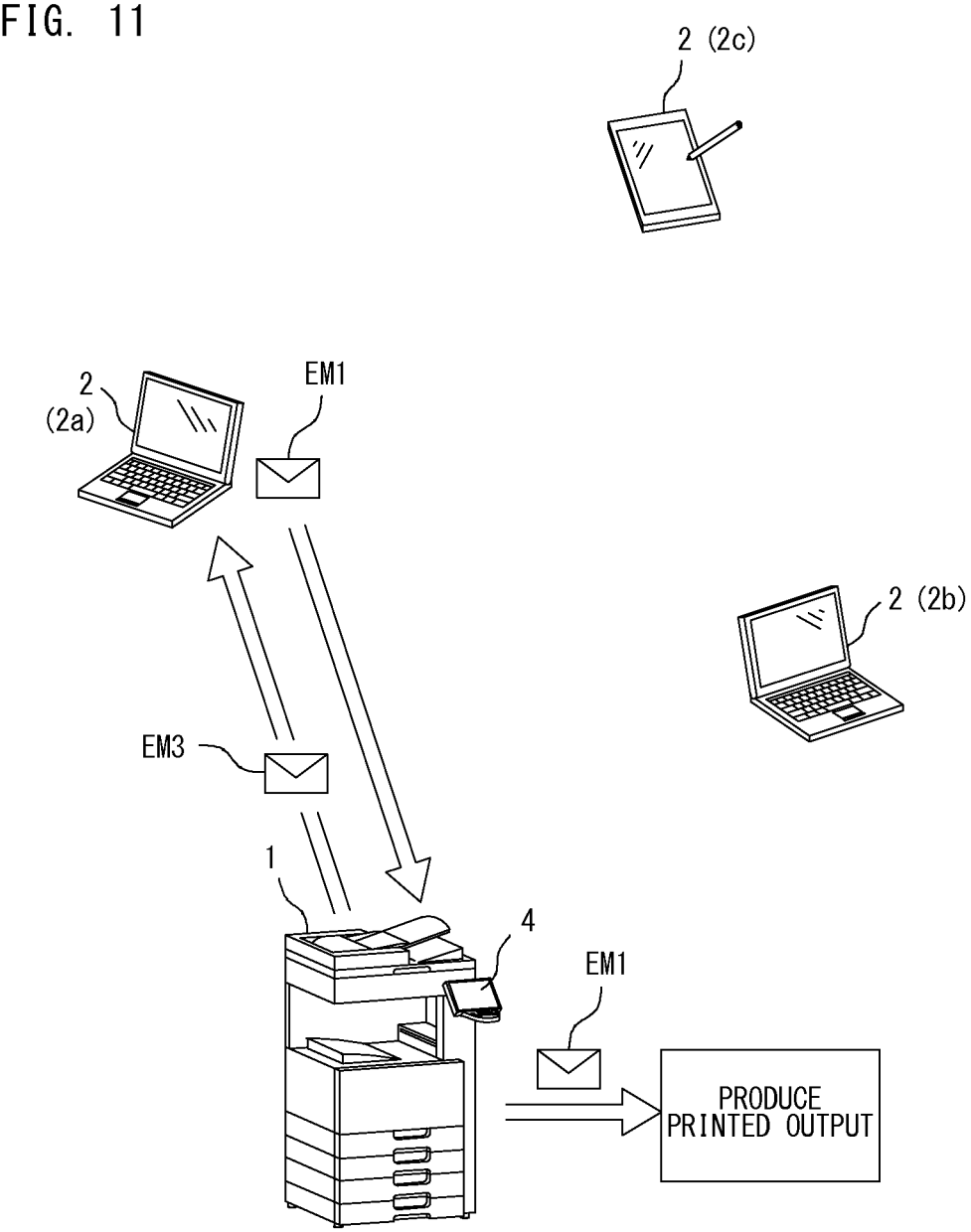
FIG. 11 shows a concept of even another exemplary operation relating to the email print function on the image forming apparatus.

FIG. 11 shows a concept of even another exemplary operation relating to the email print function on the image forming apparatus 1. The example of FIG. 11 shows a case where the image forming apparatus 1 sends a notification mail EM3 to the terminal device 2*a* because it did not produce the printed output based on the email EM1 received from the terminal device 2*a*, then receiving the same email EM1 again from the terminal device 2*a*. To be more specific, the user of the terminal device 2*a* receives the notification mail EM3 from the image forming apparatus 1 so that he or she is allowed to know that the printed output based on the email EM1 previously sent to the multiple addresses is not produced. When the user of the terminal device 2*a* would like the printed output to be produced based on the email EM1, he or she deletes the addresses designated as the recipients of the previously sent email EM1 except for the address of the image forming apparatus 1, and sends the same email EM1 again. In response to receiving the email EM1 thereby sent again, the image forming apparatus 1 extracts the address designated as the recipient of the email EM1 as described above. In this case, only one address is extracted from the email EM1 so that the image forming apparatus 1 allows the production of the printed output by the email print function. Thus, the printed output is produced based on the email EM1. If the user would like to deliberately produce the printed output, he or she just needs to create the email EM1 that is to be sent to only the address of the image forming apparatus 1 and sends the created email EM1.

Figure 12:
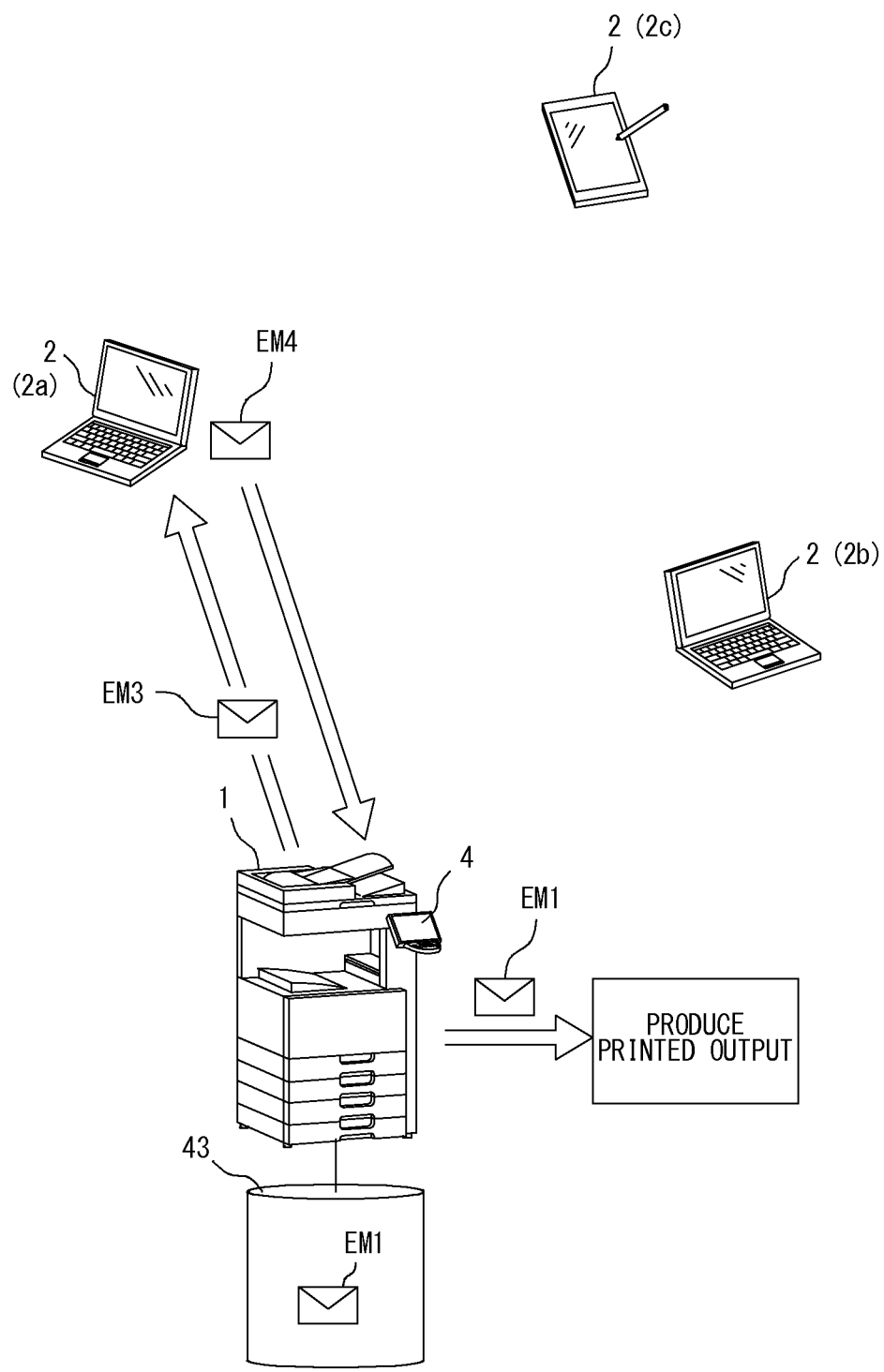
FIG. 12 shows a concept of even another exemplary operation relating to the email print function on the image forming apparatus.

FIG. 12 shows a concept of even another exemplary operation relating to the email print function on the image forming apparatus 1. The example of FIG. 12 shows a case where the image forming apparatus 1 stores the email EM1, based on which the printed output is not produced, and sends the notification mail EM3 to only the sender of the email EM1. The user of the terminal device 2*a* receives the notification mail EM3 from the image forming apparatus 1 so that he or she is allowed to know that the printed output based on the email EM1 previously sent to the multiple addresses is not produced. When the user of the terminal device 2*a* would like the printed output to be produced based on the email EM1, he or she sends a reply EM4 as a return mail to the notification mail EM3. In response to receiving the reply EM4 thereby sent, the image forming apparatus 1 identifies that the reply EM4 is the return mail to the previously sent notification mail EM3. The image forming apparatus 1 reads the email EM1 corresponding to the received reply EM4 in the email storage part 43, and produces the printed output based on the read email EM1. In this case, the user is not required to delete the addresses designated as the recipients of the previously sent email except for the address of the image forming apparatus 1, resulting in less operation burden on the user compared to the exemplary operation described in FIG. 11.

Figure 13:
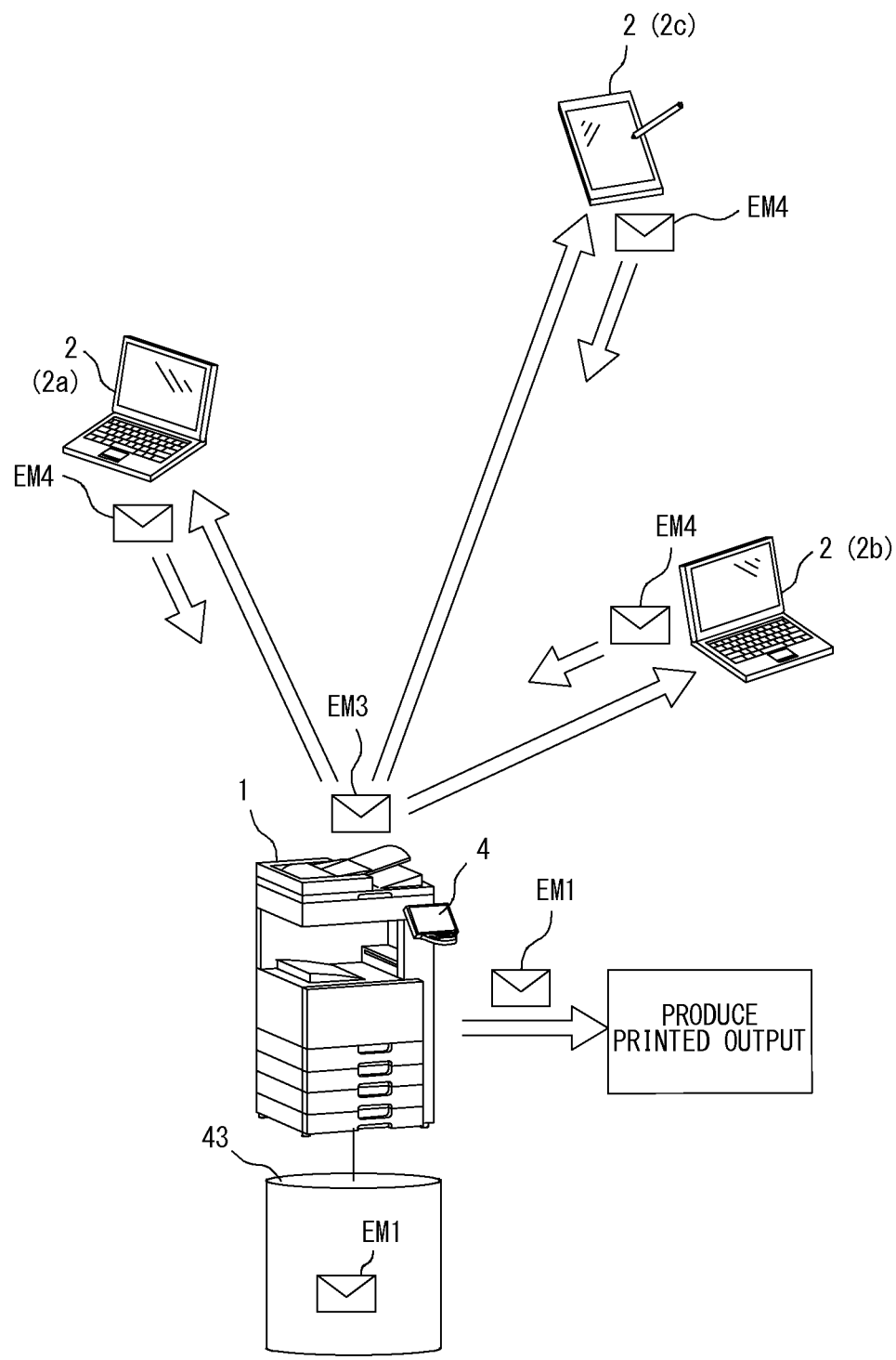
FIG. 13 shows a concept of even another exemplary operation relating to the email print function on the image forming apparatus.

FIG. 13 shows a concept of even another exemplary operation relating to the email print function on the image forming apparatus 1. The example of FIG. 12 shows a case where the image forming apparatus 1 stores the email EM1, based on which the printed output is not produced, and sends the notification mail EM3 to every address designated as the recipient of the email EM1. The user of each terminal device 2a, 2b and 2c receives the notification mail EM3 from the image forming apparatus 1 so that he or she is allowed to know that the printed output based on the email EM1 previously sent to the multiple addresses is not produced. When the user of each terminal device 2a, 2b and 2c would like the printed output to be produced based on the email EM1, he or she sends the reply EM4 to the notification mail EM3 individually. In response to receiving the reply EM4 thereby sent, the image forming apparatus 1 identifies that the reply EM4 is the return mail to the previously sent notification mail EM3. The image forming apparatus 1 reads the email EM1 corresponding to the received reply EM4 in the email storage part 43, and produces the printed output based on the read email EM1. In this case, the image forming apparatus 1 produces the printed output based on the email EM1 every time it receives the reply EM3 from each terminal device 2a, 2b and 2c. Thus, when the user of each terminal device 2a, 2b and 2c would like the printed output to be produced based on the email EM1, he or she is only required to individually send the reply EM4 to the notification mail EM3 received from the image forming apparatus 1.

As described above, the image forming apparatus 1 of the first preferred embodiment includes the print controller 20, the print control device capable of controlling the production of the printed output by the email print function. The print controller 20 includes the email receiving part 21, the address extracting part 22 and the output controlling part 23. The email receiving part 21 receives the email, and the address extracting part 22 extracts the address designated as the recipient of the email EM1 received by the email receiving part 21. The output controlling part 23 controls the production of the printed output based on the email EM1 when the email receiving part 21 receives the email EM1. The output controlling part 23 does not produce the printed output based on the email EM1 received by the email receiving part 21 if the multiple addresses are extracted by the address extracting part 22. More specifically, even when receiving the email EM1 sent to its address, the image forming apparatus 1 of the first preferred embodiment does not produce the printed output if the received email EM1 is sent to the multiple addresses. The sender of the email EM1 may send without noticing the address of the image forming apparatus 1 is included in the recipients. Even in such a case, production of unnecessary printed output by the image forming apparatus 1 may be prevented.

The print controller 20 of the first preferred embodiment further includes the number of address storage part 41 in which the number of the addresses N set in advance to restrict the production of the printed output is stored. When the multiple addresses, the number of which is equal to or more than the number of the addresses N, are extracted by the address extracting part 22, the output controlling part 23 does not produce the printed output based on the email EM1 received by the email receiving part 21. The number of the addresses N is set in advance. As a result, when so many addresses that the user is difficult to even look up in advance them to see whether the address of the image forming apparatus 1 is included are in the recipients of the email EM1, the production of unnecessary printed output by the image forming apparatus 1 may be prevented.

The print controller 20 of the first preferred embodiment further includes the character string storage part 42 in which the character string set in advance to restrict the production of the printed output is stored. It is assumed that the multiple addresses are extracted by the address extracting part 22. In this case, the output controlling part 23 analyzes whether or not the character string set in advance is contained in the email EM1 received by the email receiving part 21, and does not produce the printed output based on the email EM1 if the character string is contained. The sender of the email EM1 sometimes feels it is bothersome to check if the address of the image forming apparatus 1 is included in the multiple recipients of the email EM1. In such a case, the user adds the print restricted character string set in advance to the email EM1 so that the production of unnecessary printed output may be prevented efficiently. The character string such as "Re" indicating that the mail is the reply may be set in advance as the print restricted character string as described above. Then, the user is allowed to configure the image forming apparatus 1 not to produce the printed output based on the reply EM1 when the image forming apparatus 1 receives the reply EM1 designates the multiple addresses as the recipients.

The print controller 20 of the first preferred embodiment further includes the email transmitting part 24. The email transmitting part 24 sends the notification mail EM3 notifying that the printed output is not produced to the sender of the email EM1 received by the email receiving part 21 when the output controlling part 23 does not produce the printed output based on the email EM1. The sender of the email EM1 is allowed to know that the printed output based on the email EM1 is not produced by receiving such notification mail EM3 from the image forming apparatus 1. So, when the sender of the email EM1 would like the printed output based on the email EM1 to be produced, he or she may make an appropriate operation to do so immediately.

The print controller 20 of the first preferred embodiment further includes the email storage part 43. When the output controlling part 23 does not produce the printed output based on the email EM1, the email EM1 is stored in the email storage part 43. When the reply EM4 to the notification mail EM3 is received by the email receiving part 21, the output controlling part 23 reads the email EM1 in the email storage part 43 and produces the printed output based on the read email EM1. As described above, when the sender of the email EM1 would like the printed output based on the email EM1 to be produced, he or she only needs to make the operation to send the reply EM4 to the notification mail EM3, resulting in enhanced operability.

The print controller 20 of the first preferred embodiment allows the email transmitting part 24 to send the notification mail EM3 to all the multiple addresses extracted by the address extracting part 22. The output controlling part 23 reads the email EM1 in the email storage part 43 and produces the printed output based on the read email EM1 every time the email receiving part 21 receives the reply EM4 to the notification mail EM3. As a result, the notification mail EM3 is sent individually to every user who has received the previous email EM1. When each user would like the printed output based on the email EM1 to be produced, he or she only needs to make the operation to send the reply EM4 to the notification mail EM3, resulting in further improvement in operability.

(Second Preferred Embodiment)

A second preferred embodiment is described next. In the second preferred embodiment, inclusion of the address of the image forming apparatus 1 with the email print function in the recipient of the email EM1 is prevented when the terminal device 2 sends the email EM1 to the multiple addresses. In the second preferred embodiment, the configurations of the network system and the image forming apparatus 1 are the same as those of the first preferred embodiment.

Figure 14:
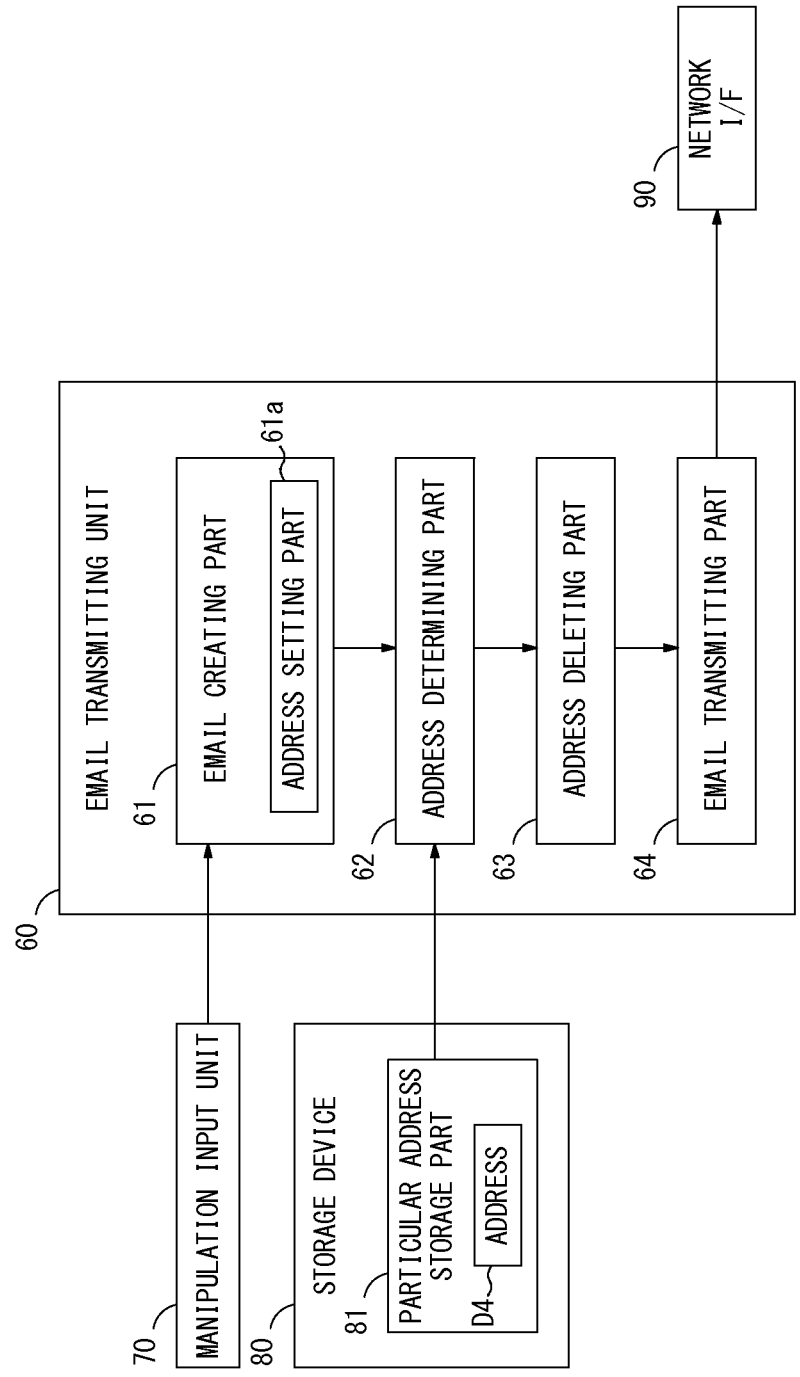
FIG. 14 is a block diagram showing an exemplary functional configuration of a terminal device that serves as an email transmission device.

FIG. 14 is a block diagram showing an exemplary functional configuration of the terminal device 2 that serves as the email transmission device. As illustrated in FIG. 14, the terminal device 2 includes a manipulation input unit 70, a storage device 80, an email transmitting unit 60 and a network interface 90. The manipulation input unit 70 is operable by the user for making the operation. The storage device 80 is formed from a device such as a hard disk drive (HDD) or a solid state drive (SSD). The network interface 90 is for establishing network communication over the network 3.

The manipulation input unit 70 formed from a keyboard, a mouse and/or a touch pad, for example, receives the input operation made by the user and outputs operation information to the email transmitting unit 60. The storage device 80 includes a particular address storage part 81. An address D4 of the image forming apparatus 1 with the email print function is stored in advance in the particular address storage part 81.

The email transmitting unit 60 includes a CPU, a ROM and a RAM, for instance. The CPU runs an application program for email transmission so that the email transmitting unit 60 serves as an email creating part 61, an address determining part 62, an address deleting part 63 and an email transmitting part 64.

The email creating part 61 creates the email EM1 to send based on the operation information received from the manipulation input unit 70. The email creating part 61 includes an address setting part 61a. The address setting part 61a sets the address to be the recipient of the email EM1 in accordance with the user's instruction. The address setting part 61a may set the multiple addresses as the recipients of the email EM1 to send.

When the multiple addresses are set as the recipients of the email EM1 by the address setting part 61a, the address determining part 62 determines whether or not the address D4 of the image forming apparatus 1 with the email print function is included in the set multiple addresses. More specifically, when the multiple addresses are set by the address setting part 61a, the address determining part 62 reads the address D4 of the image forming apparatus 1 with the email print function in the particular address storage part 81 and determines whether or not the read address D4 is included in the multiple addresses set as the recipients of the email EM1. When the address D4 is included in the multiple addresses set as the recipients of the email EM1, the address determining part 62 brings the address deleting part 63 into operation.

The address deleting part 63 automatically deletes the address D4 detected by the address determining part 62 from the addresses set as the recipients of the email EM1. It is assumed, for example, that the multiple addresses D4 of the image forming apparatus 1 with the email print function are detected by the address determining part 62. In this case, the address deleting part 63 deletes the multiple addresses D4 from the recipients of the email EM1. The user who is the sender of the email EM1 copies the multiple addresses set as the recipients of the email sent and received in the past to set the address of the new email EM1. Even in such a case, when the address D4 of the image forming apparatus 1 with the email print function is included in the addresses set as the recipients of the email EM1, the address D4 is automatically deleted.

The email transmitting part 64 sends the email EM1, the address D4 of the image forming apparatus 1 with the email print function is deleted from the addresses of which by the address deleting part 63, over the network 3 via the network interface 90.

As described above, according to the second preferred embodiment, when sending the email EM1 setting the multiple addresses as the recipients, the terminal device 2, the email transmission device, automatically detects whether or not the address D4 of the image forming apparatus 1 with the email print function is included in the addresses set as the recipients, and automatically deletes the address D4 from the addresses set as the recipients of the email EM1 if the address D4 is detected. The user of the terminal device 2 is not necessary to worry about whether or not the address D4 of the image forming apparatus 1 with the email print function is included in the multiple addresses even when he or she sends the email EM1 to the multiple addresses. Transmission of the email EM1 from the terminal device 2 to the image forming apparatus 1 with the email print function is prevented. As a result, the production of the unnecessary printed output by the image forming apparatus 1 is prevented efficiently.

According to the second preferred embodiment, the user received the email EM1 from the terminal device 2 may create the reply without changing the multiple addresses set as the recipients of the email EM1 to send. Even in such a case, transmission of the reply to the image forming apparatus 1 is prevented. Thus, even for the reply, the production of the unnecessary printed output by the image forming apparatus 1 is prevented efficiently.

As described above, the production of the printed output based on the received email may be controlled if the multiple addresses are designated as the recipients of the received email. As a result, the production of the unnecessary printed output by the email print function is prevented.

(Modifications)

While the preferred embodiments of the present invention have been described above, the present invention is not limited to the preferred embodiments. Various modifications may be applied to the present invention.

The image forming apparatus 1 of the above-described preferred embodiments includes the email print function. The technique explained in each preferred embodiment can be applied even when the image forming apparatus 1 does not include the email print function.

Figure 15:
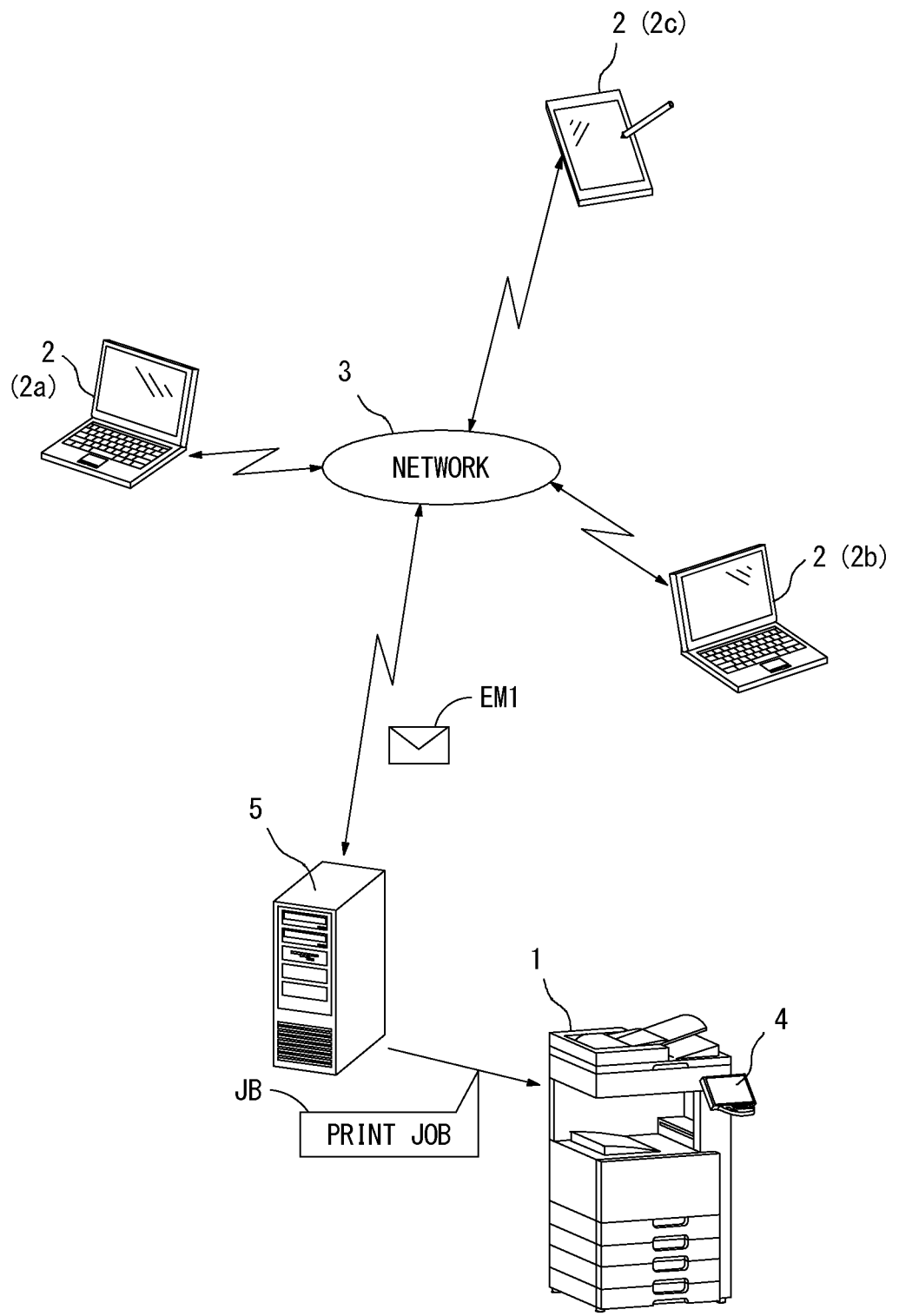
FIG. 15 shows an exemplary configuration of the image forming apparatus which does not include the email print function and a print server includes the email print function.

FIG. 15 shows an exemplary configuration of the image forming apparatus 1 which does not include the email print function. In the example of FIG. 15, a print server 5 is connected to the network 3. The print server 5 is a print control device that sends a print job JB to the image forming apparatus 1, thereby controlling the production of the printed output on the image forming apparatus 1. The print server 5 is also capable of sending and receiving the email EM1 to and from the other terminal devices 2 over the network 3. In response to receiving the email EM1 which sets the address of the print server 5 as the recipient over the network 3, the print server 5 generates the print job JB based on the received email EM1 and outputs the print job JB to the image forming apparatus 1, thereby causing the image forming apparatus 1 to produce the printed output based on the email EM1.

The print server 5 receives the email EM1 over the network 3. According to the above-described configuration, in this case, the same process as described in above preferred embodiments is performed if the multiple addresses are set as the recipients of the email EM1. As a result, the production of the unnecessary printed output by the image forming apparatus 1 may be prevented. The functions of the print controller 20 described in the first preferred embodiment, therefore, may be included in the print server 5.

What is claimed is:

1. A print control device, comprising a processor configured to:
   receive an email;
   extract each address designated as a recipient of the email;
   control production of a printed output based on the email; and
   obtain a number of addresses extracted, wherein the processor does not produce the printed output based on the email received when the number of addresses extracted is greater than a predetermined address limit pertaining to a limit for the number of addresses.

2. The print control device according to claim 1, further comprising:
   a number of address storage part in which the predetermined address limit, based on which the production of the printed output is restricted, is stored in advance.

3. The print control device according to claim 1, further comprising:
   a character string storage part in which a character string set in advance to restrict the production of the printed output is stored, wherein
   the processor is further configured to, when the number of addresses extracted is greater than the predetermined address limit, analyze whether or not said character string is contained in the email received, and not produce the printed output if said character string is contained.

4. The print control device according to claim 1, wherein the processor is further configured to:
   send a notification mail notifying that the printed output is not produced to a sender of the email received when the processor does not produce the printed output based on the email.

5. The print control device according to claim 4, further comprising:
   an email storage part in which the email received is stored when the processor does not produce the printed output based on the email, wherein
   the processor is configured to read the email stored in said email storage part and produce the printed output based on the read email when a reply to said notification mail is received.

6. The print control device according to claim 5, wherein the processor is configured to:
   send said notification mail without changing the addresses extracted that are to receive said notification mail, and
   read the email stored in said email storage part and produce the printed output based on the read email when the reply to said notification mail is received.

7. A print controlling method for controlling production of a printed output based on an email in response to receiving the email, comprising the steps of:
   (a) receiving the email;
   (b) extracting an address designated as a recipient of the email received in said step (a);
   (c) obtaining a number of addresses extracted; and
   (d) controlling not to produce the printed output based on the email received in said step (a) when the number of addresses extracted is greater than a predetermined address limit pertaining to a limit for the number of addresses.

8. The print controlling method according to claim 7, further comprising the step of:
   (e) storing the predetermined address limit, based on which the production of the printed output is restricted, set in advance.

9. The print controlling method according to claim 7, further comprising the step of:
   (e) storing a character string set in advance to restrict the production of the printed output, wherein
   in said step (d), when the number of addresses obtained in said step (c) is greater than the predetermined address limit, analyzing whether or not said character string is contained in the email received in said step (a), and controlling the printed output not to be produced if said character string is contained.

10. The print controlling method according to claim 7, further comprising the step of:
    (f) sending a notification mail notifying that the printed output is not produced to a sender of the email received in said step (a) when the printed output is not produced based on the email in said step (d).

11. The print controlling method according to claim 10, further comprising the step of:
    (g) storing the email received in said step (a) when the printed output based on the email is not produced in said step (d), wherein
    in said step (d), the email stored in said step (g) is read and the printed output based on the read email is produced when a reply to said notification mail is received in said step (a).

12. The print controlling method according to claim 11, wherein
    in said step (f), said notification mail is sent without changing the multiple addresses extracted in said step (b) that are to receive said notification mail, and
    in said step (d), the email stored in said step (g) is read and the printed output based on the read email is produced every time the reply to said notification mail is received in said step (a).

13. A non-transitory computer readable recording medium on which a program is recorded, said program executable on a print control device capable of controlling production of a printed output based on an email in response to receiving the email, said program causing said print control device to execute the steps of:
    (a) receiving the email;
    (b) extracting an address designated as a recipient of the email received in step (a);
    (c) obtaining a number of addresses extracted; and
    (d) controlling not to produce the printed output based on the email received in step (a) when the number of addresses extracted is greater than a predetermined address limit pertaining to a limit for the number of addresses.

14. The non-transitory computer readable recording medium according to claim 13, said program causing said print control device to execute the further step of:
    (e) storing the predetermined address limit, based on which the production of the printed output is restricted, stored in advance.

15. The non-transitory computer readable recording medium according to claim 13, said program causing said print control device to execute the further step of:
    (e) a character string set in advance to restrict the production of the printed output, wherein
    in said step (d), when the number of addresses obtained in said step (c) is greater than the predetermined address limit, analyzing whether or not said character string is contained in the email received in said step (a), and controlling the printed output not to be produced if said character string is contained.

16. The non-transitory computer readable recording medium according to claim 13, said program causing said print control device to execute the further step of:
(f) sending a notification mail notifying that the printed output is not produced to a sender of the email received in step (a) when the printed output is not produced based on the email in said step (d).

17. The non-transitory computer readable recording medium according to claim 16, said program causing said print control device to execute the further step of:
(g) storing the email received in said step (a) when the printed output based on the email is not produced in said step (d), wherein
in said step (d), the email stored in said step (g) is read and the printed output based on the read email is produced when a reply to said notification mail is received in said step (a).

18. The non-transitory computer readable recording medium according to claim 17, wherein
in said step (f), said notification mail is sent without changing the multiple addresses extracted in said step (b) that are to receive said notification mail, and
in said step (d), the email stored in said step (g) is read and the printed output based on the read email is produced every time the reply to said notification mail is received in step (a).

19. The printer control device according to claim 1, wherein the predetermined address limit is set to one.

20. The print controlling method according to claim 7, wherein the predetermined address limit is set to one.

21. The non-transitory computer readable recording medium according to claim 13, wherein the predetermined address limit is set to one.

* * * * *